US009635209B2

United States Patent
Suto et al.

(10) Patent No.: US 9,635,209 B2
(45) Date of Patent: *Apr. 25, 2017

(54) ILLUMINATING DEVICE, IMAGE READING DEVICE, AND IMAGE FORMING DEVICE INCLUDING THE ILLUMINATING DEVICE AND THE IMAGE READING DEVICE

(71) Applicant: Sharp Kabushiki Kaisha, Osaka-shi, Osaka (JP)

(72) Inventors: Yasuhiro Suto, Osaka (JP); Kenji Nakanishi, Osaka (JP); Shohichi Fukutome, Osaka (JP); Masahiro Imoto, Osaka (JP); Kazuhiro Iguchi, Osaka (JP); Hiroki Kuruma, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,842

(22) Filed: Jun. 16, 2016

(65) Prior Publication Data

US 2016/0301820 A1 Oct. 13, 2016

Related U.S. Application Data

(63) Continuation of application No. 14/722,178, filed on May 27, 2015, now Pat. No. 9,398,186.

(30) Foreign Application Priority Data

Jul. 3, 2014 (JP) ................................ 2014-137402

(51) Int. Cl.
*H04N 1/04* (2006.01)
*H04N 1/028* (2006.01)
*F21V 8/00* (2006.01)

(52) U.S. Cl.
CPC ....... *H04N 1/02855* (2013.01); *G02B 6/0006* (2013.01); *H04N 1/02835* (2013.01);
(Continued)

(58) Field of Classification Search
CPC ........ F21V 13/02; F21V 33/0052; F21V 9/06; F21V 9/10; G02F 2001/133607;
(Continued)

(56) References Cited

U.S. PATENT DOCUMENTS 9,398,186 B2 * 7/2016 Suto ................... H04N 1/02835
2010/0124439 A1 * 5/2010 Suto ................. G03G 15/04036
399/220

(Continued)

OTHER PUBLICATIONS

Suto et al., "Illuminating Device, Image Reading Device, and Image Forming Device Including the Illuminating Device and the Image Reading Device", U.S. Appl. No. 14/722,178, filed May 27, 2015.

*Primary Examiner* — Negussie Worku
(74) *Attorney, Agent, or Firm* — Keating & Bennett, LLP

(57) ABSTRACT

In an image forming device, a light-guiding member includes an integrated ridge extending in the longitudinal direction of the light-guiding member. The light-guiding member further includes a protrusion on the ridge. The illuminating device includes an attachment recess that holds the light-guiding member and a holder member that has a fit portion to which a protrusion is fitted. The protrusion is disposed at a position decentered to one end portion of the light-guiding member in the longitudinal direction of the light-guiding member.

19 Claims, 15 Drawing Sheets

(52) U.S. Cl.
CPC .......... *G02B 6/0073* (2013.01); *G02B 6/0088* (2013.01); *H04N 2201/0081* (2013.01)

(58) Field of Classification Search
CPC ......... G02F 1/133606; G02F 1/133615; F21Y 2101/02; F21Y 2105/00; G03B 27/54
USPC ....... 358/474, 475, 482, 483, 484, 487, 496, 358/498, 505, 506, 509; 382/124, 135
See application file for complete search history.

(56) References Cited

U.S. PATENT DOCUMENTS

| | | | | |
|---|---|---|---|---|
| 2011/0164413 | A1* | 7/2011 | Yamada | G03B 27/54 362/217.05 |
| 2011/0199652 | A1* | 8/2011 | Imoto | H04N 1/02815 358/474 |
| 2012/0206779 | A1* | 8/2012 | Suto | H04N 1/02845 358/475 |
| 2014/0376254 | A1* | 12/2014 | Arimoto | H04N 1/02835 362/583 |
| 2015/0055195 | A1* | 2/2015 | Suto | H04N 1/02815 358/475 |
| 2015/0365556 | A1* | 12/2015 | Imoto | H04N 1/02895 358/475 |

* cited by examiner

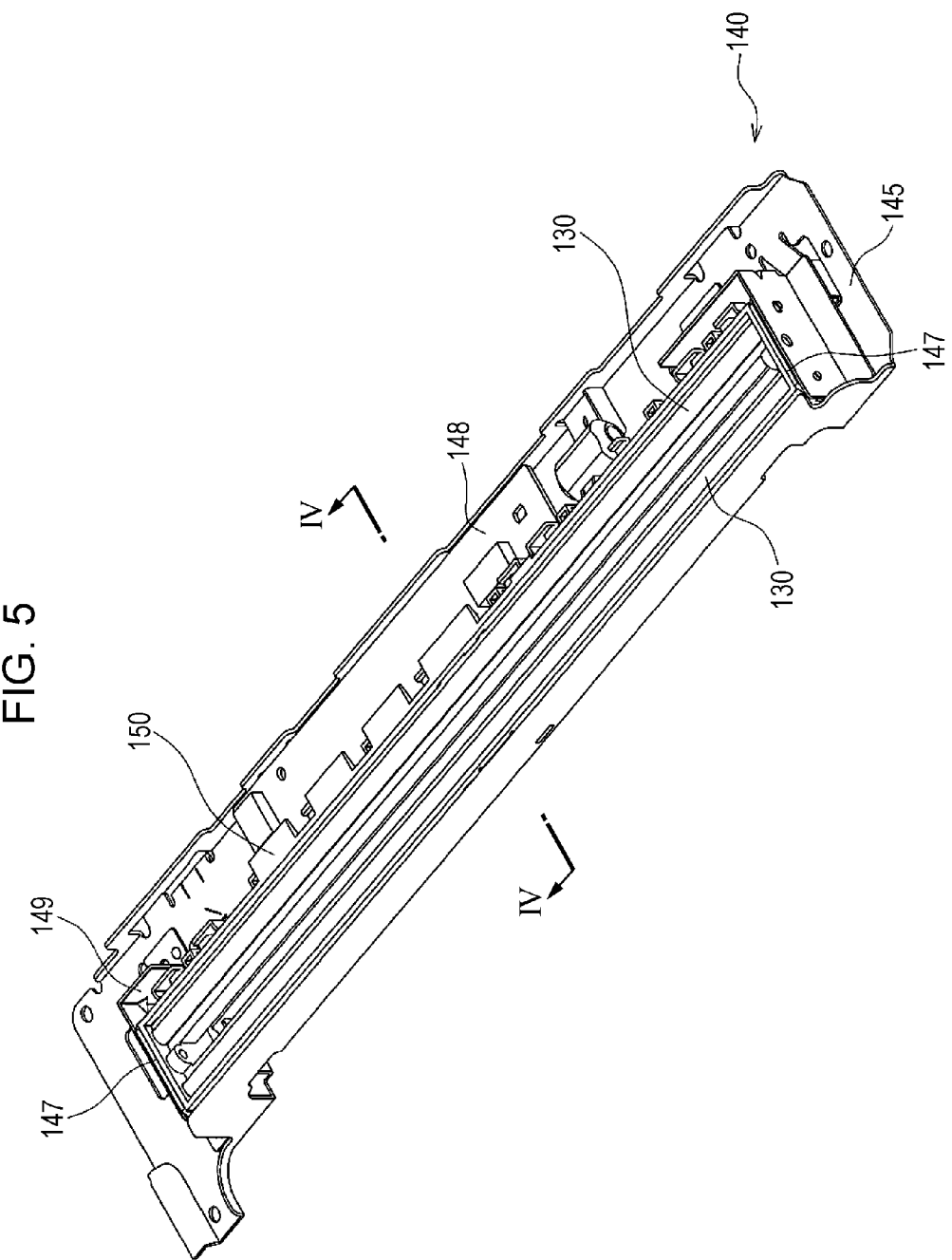

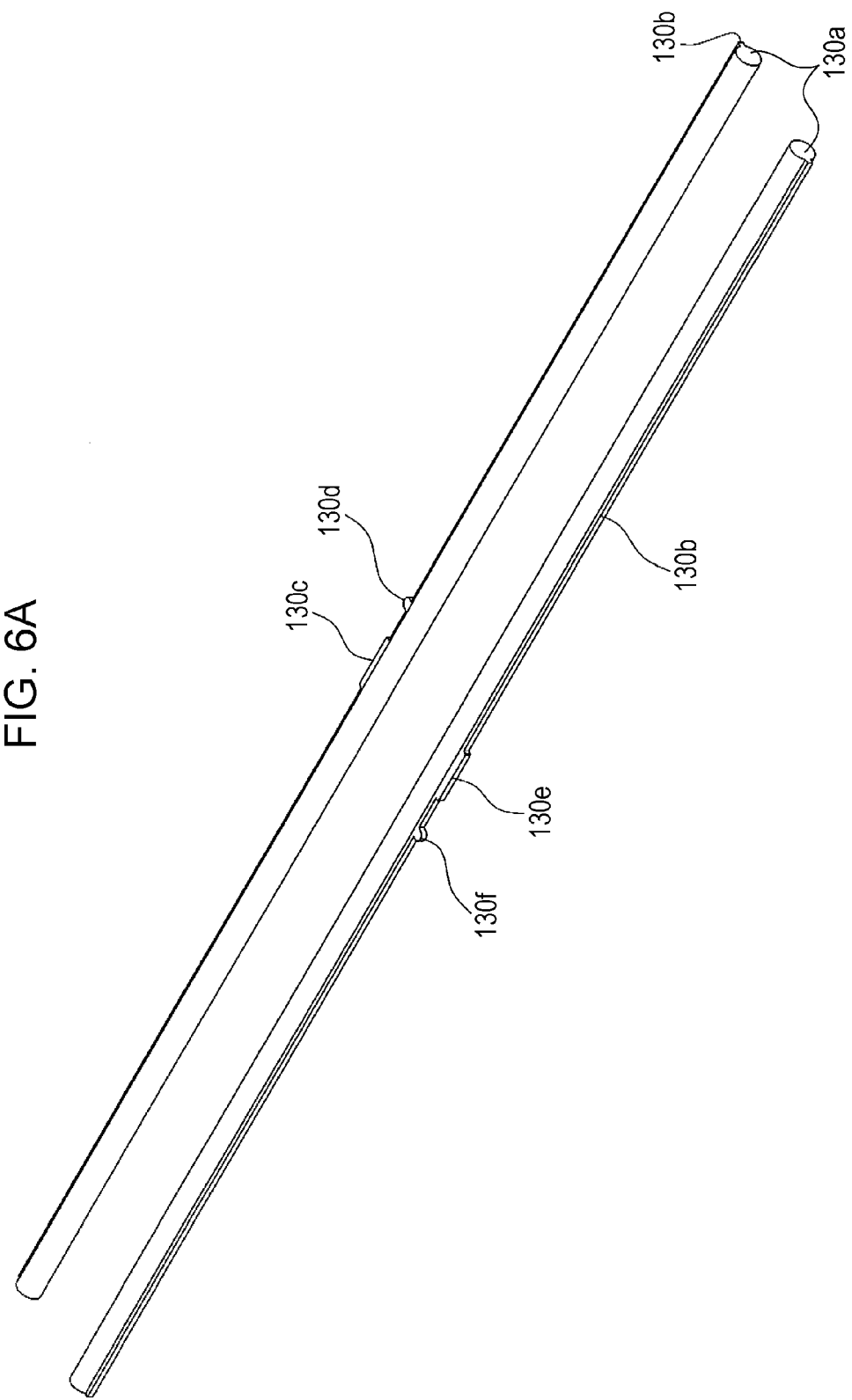

ILLUMINATING DEVICE, IMAGE READING DEVICE, AND IMAGE FORMING DEVICE INCLUDING THE ILLUMINATING DEVICE AND THE IMAGE READING DEVICE

BACKGROUND

1. Field

The present disclosure relates to an illuminating device, an image reading device, and an image forming device including the illuminating device and the image reading device.

2. Description of the Related Art

Typical image reading devices read a document by repeatedly scanning the document in a main-scanning direction using an image sensor, such as a charge coupled device (CCD), while transporting the document over a glass plate in a sub-scanning direction and illuminating the document using a light source unit under the glass plate or while keeping the document fixed at a determined position on the glass plate, moving components such as the light source unit and the image sensor in the sub-scanning direction under the glass plate, and illuminating the document using the light source unit. Examples usable as the light source unit that illuminates a document include various types such as a fluorescent light or a LED array.

In such image reading devices, a light source or the like emits light for illuminating a document, the light is thrown on the document surface via a component such as a light-guiding member, and then the light (read light) reflected off the document surface is guided to the image sensor, such as a CCD, along a predetermined optical path for imaging. At this time, the light undergoes scatter reflections while being guided inside the light-guiding member and is then ejected from the emerging surface. Thus, in order to illuminate a subject, such as a document, with a uniform amount of light, the light source and the light-guiding member are required to be positioned accurately as designed.

In order to address the above-described problem, Japanese Unexamined Patent Application Publication No. 10-190959 discloses a light-guiding member including integrated multiple protrusions. The protrusions are pressure-inserted and fitted into recessed portions in the casing so as to accurately and easily position the light-guiding member.

However, the light-guiding member according to Japanese Unexamined Patent Application Publication No. 10-190959 that has multiple integrated protrusions has the following problem. When light that has been incident on the light-guiding member from the light source transmits through the light-guiding member and spreads uniformly, part of the light may be scattered by the protrusions, taken outside through the protrusions, or concentrated on the protrusions, whereby an uneven amount of light may be thrown on the subject from some area of the light emerging surface. Measures taken to prevent an occurrence of an area from which light is thrown in an uneven amount may disadvantageously impair the design freedom in terms of, for example, the positions or the shapes of the protrusions.

The above-described light-guiding member also has the following problem. Since having a long shape, the lengthwise strength of the light-guiding member is insufficient. Thus, the light-guiding member is more likely to bend due to, for example, vibrations resulting from scanning during a reading operation, the bending or warpage disturbs light transmission through the light-guiding member, and an uneven amount of light may be thrown on the subject from some area of the light emerging surface.

SUMMARY

It is desirable to provide an illuminating device, an image reading device, and an image forming device including the illuminating device and the image reading device that can minimize warpage of a long light-guiding member while the light-guiding member is allowed to be accurately and easily positioned and that can illuminate a subject with a uniform amount of light.

According to an aspect of the disclosure, there is provided an illuminating device that includes a light-emitting device that emits light and a long light-guiding member that guides the light from the light-emitting device inside thereof and that has a light emerging surface from which the light is thrown on a subject. The light emerging surface extends in a longitudinal direction of the light-guiding member. The light-guiding member includes an integrated ridge extending in the longitudinal direction.

BRIEF DESCRIPTION OF THE DRAWINGS

FIG. 5 is a schematic perspective view of a schematic structure of a light source unit according to the embodiment;

FIG. 6A is a general perspective view of light-guiding members;

DESCRIPTION OF THE EMBODIMENTS

First Embodiment

Figure 1:
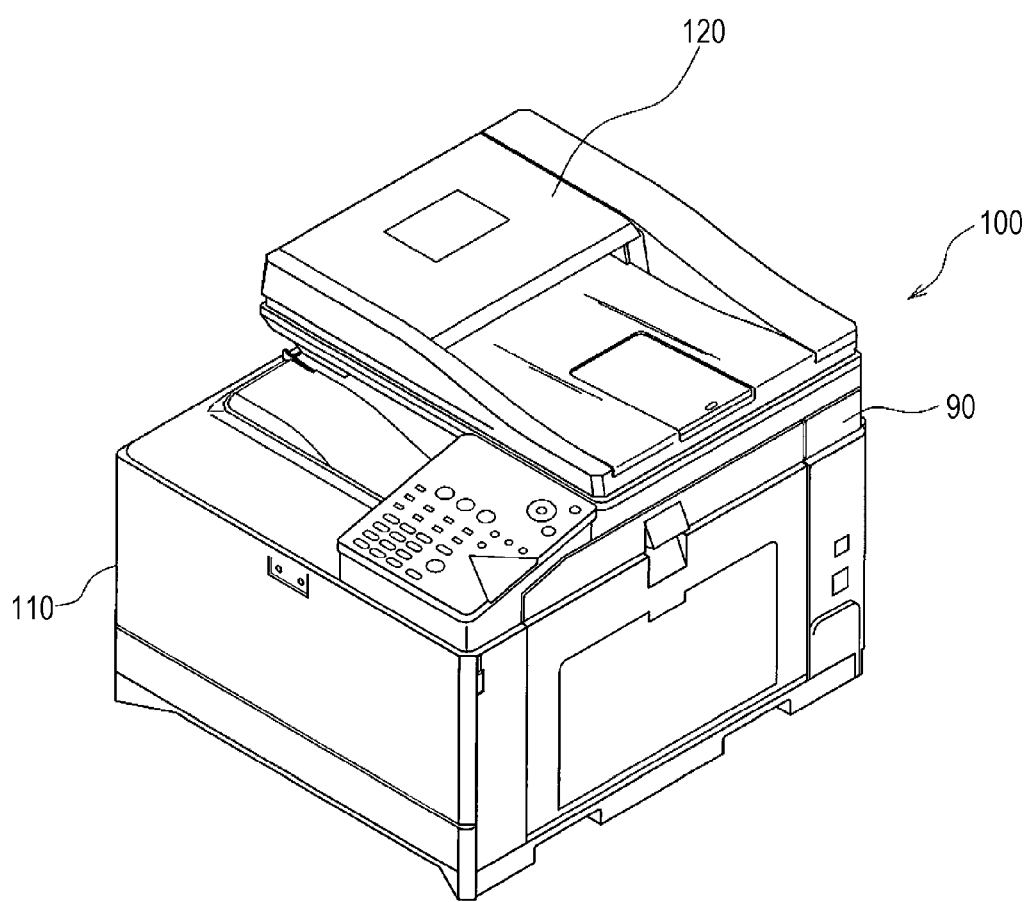
FIG. 1 is a schematic perspective view of an example of the structure of an image forming device according to an embodiment of the disclosure.

Referring now to the drawings, an embodiment of the disclosure is described in detail below. Firstly, examples of the structures of a document reading device and an image forming device according to an embodiment of the disclosure are described.

Figure 2:
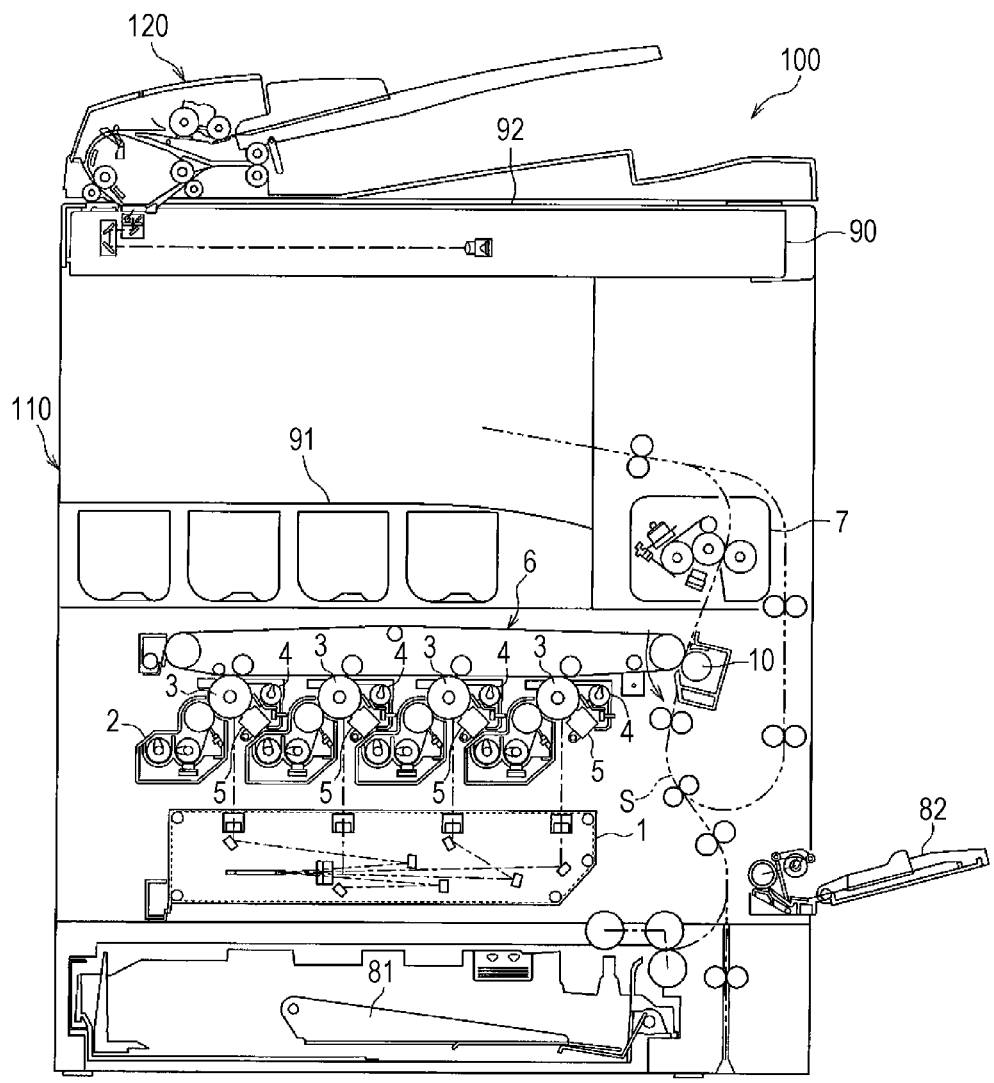
FIG. 2 is a rough cross-sectional view of an example of the structure of an image forming device according to an embodiment of the disclosure.

FIG. 1 is a schematic perspective view of an image forming device 100 according to an embodiment of the disclosure. FIG. 2 is a rough cross-sectional view of the image forming device 100 according to an embodiment of the disclosure. The image forming device 100 includes a device body 110 and an automatic document feeder 120. The device body 110 includes a document reading portion 90, which reads images of documents, and a document receiving table 92, on which documents are placed.

The document reading portion 90 is disposed at an upper portion of the device body 110. The document receiving table 92 is made of a transparent glass and disposed above the document reading portion 90. The automatic document feeder 120 is disposed above the document receiving table 92. The automatic document feeder 120 automatically transports a document to the document receiving table 92. The automatic document feeder 120 is rotatable around a shaft that connects the device body 110 and the automatic document feeder 120 together. Uncovering the document receiving table 92 allows a document to be manually placed on the document receiving table 92.

The automatic document feeder 120, the document reading portion 90, and the document receiving table 92 constitute a document reading device according to an embodiment of the disclosure.

The image forming device 100 forms multicolored and unicolored images on predetermined paper sheets (media) in accordance with an image of a document read by the document reading device or image data received from external devices.

The device body 110 includes an exposure unit 1, developing devices 2, photoconductor drums 3, cleaner units 4, charging devices 5, an intermediate transfer belt unit 6, a fixing unit 7, and a second transfer unit 10. Image data handled in the image forming device 100 corresponds to color images using black (K), cyan (C), magenta (M), and yellow (Y). Thus, in order to form four types of latent images corresponding to the respective colors, four developing devices 2, four photoconductor drums 3, four charging devices 5, and four cleaner units 4 are provided and used for forming images of black (K), cyan (C), magenta (M), and yellow (Y). These four developing devices 2, four photoconductor drums 3, four charging devices 5, and four cleaner units 4 constitute four image stations.

The image forming device 100 also includes a sheet cassette 81, a manual-feed sheet cassette 82, and an ejection tray 91.

Figure 3:
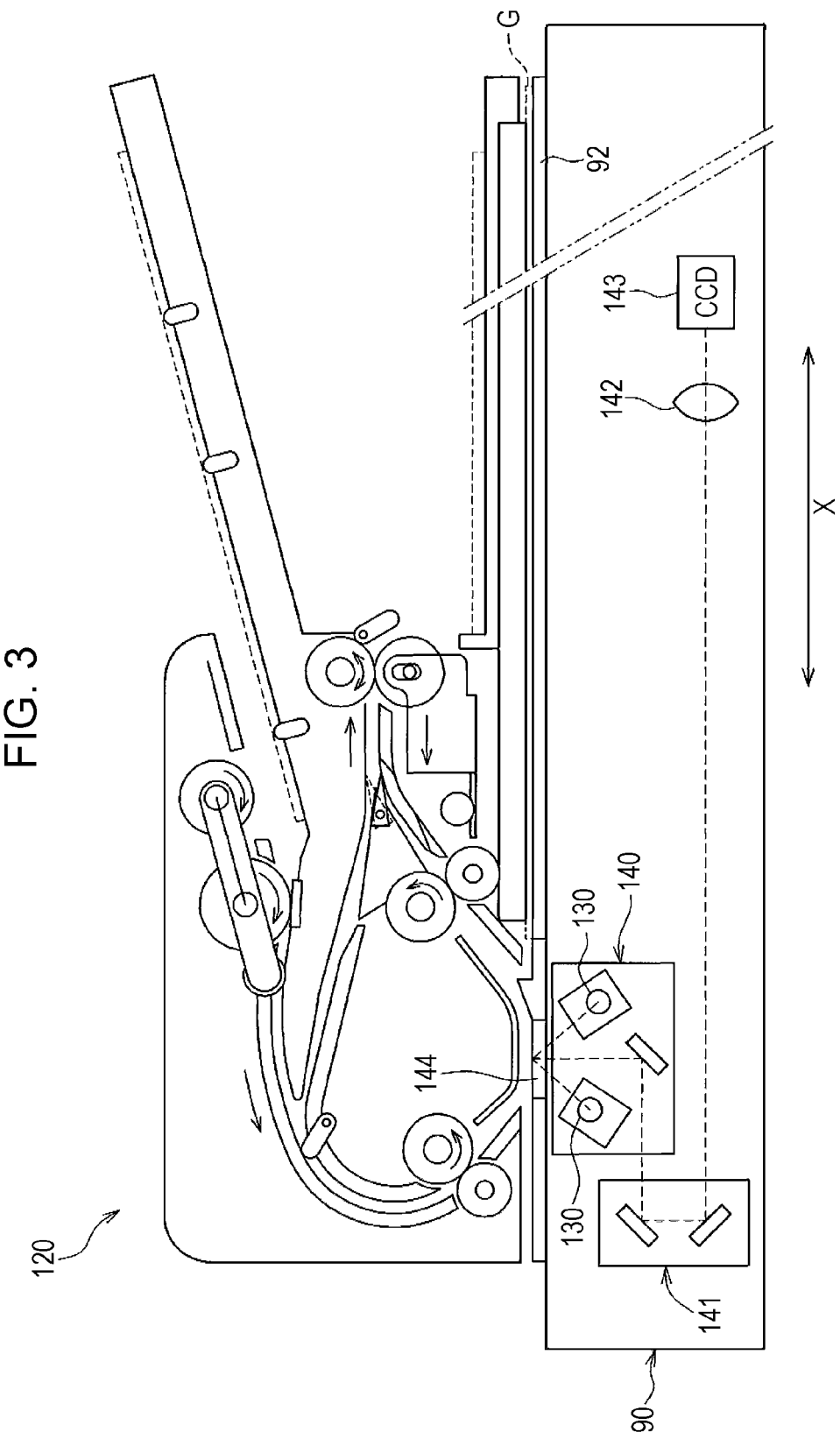
FIG. 3 is a rough cross-sectional view of an example of the structure of a document reading device according to an embodiment of the disclosure.

FIG. 3 is a rough vertical section of the document reading device illustrated in FIGS. 1 and 2, that is, a set of the automatic document feeder 120, the document reading portion 90, and the document receiving table 92.

The document reading portion 90 includes a light source unit 140, including light-guiding members 130, a mirror unit 141, a condensing lens 142, and an image sensor (here, a CCD) 143.

The document receiving table 92 is made of a transparent glass plate. Both end portions of the document receiving table 92 in the main-scanning direction are placed on a frame of the document reading portion 90. The automatic document feeder 120 is rotatable, so as to cover or be removed from the document reading portion 90, around a shaft (while being axially supported by, for example, a hinge) extending in the sub-scanning direction (in the direction along an arrow X in FIG. 3). The undersurface of the automatic document feeder 120 also serves as a document cover (not illustrated) that holds down from above a document G placed on the document receiving table 92 on the document reading portion 90.

The document reading device reads a document image of the document G by a document fixing method while keeping the document G fixed and also reads a document image of the document G by a document moving method while moving the document G.

When a document image of the document G is read by the document fixing method, the light source unit 140 scans the document G placed on the document receiving table 92 to obtain an image of the document G while throwing light on the document G through the document receiving table 92 and moving in a first sub-scanning direction X at a predetermined speed. Here, the light-guiding members 130 throw light, from under the document receiving table 92, on the surface of the document receiving table 92 on which the document G is placed. At the same time, the mirror unit 141 similarly moves in the first sub-scanning direction X at a speed half the speed at which the light source unit 140 moves.

The reflected light (read light), reflected off the document G illuminated by the light source unit 140, is reflected off a first mirror of the light source unit 140, thrown on second and third mirrors of the mirror unit 141 by which its optical path is changed, and focused on the image sensor 143 through the condensing lens 142. Here, the document image light is read and converted into electric image data.

When, on the other hand, a document image of the document G is read by the document moving method, the document G is transported by the automatic document feeder 120 in the first sub-scanning direction X in such a manner as to pass through an upper portion of FIG. 2 while the light source unit 140 and the mirror unit 141 remain still at the positions illustrated in FIG. 2.

Then, light from the light source unit 140 is thrown, through a document reading glass 144, on a surface of the document G that has passed over the document reading glass 144 and reflected off the surface of the document G. As in the case of the document fixing method, the light reflected off the document G is then sequentially thrown on the first mirror, the second mirror, and the third mirror by which its optical path is changed and focused on the image sensor 143 through the condensing lens 142. Here, the document image is read and converted into electrical image data.

Figure 4:
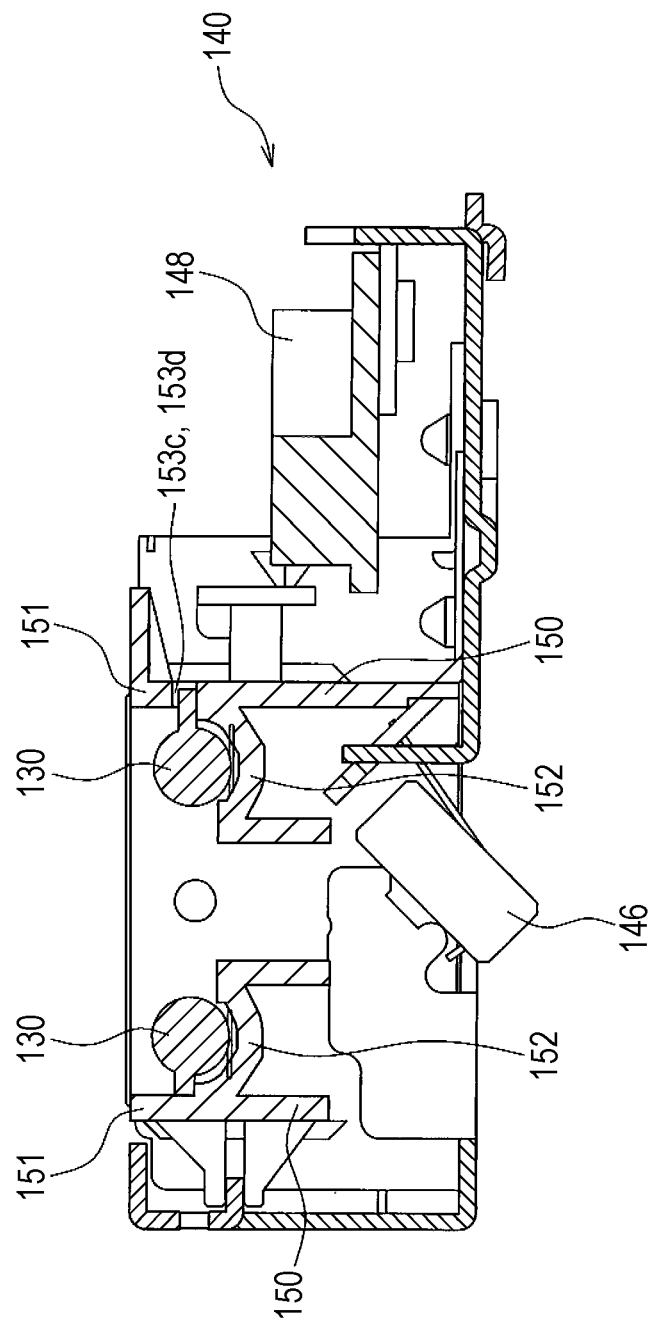
FIG. 4 is a rough cross-sectional view of a light source unit according to a first embodiment.

The light source unit 140 according to an embodiment of the disclosure may include one or more light-guiding members. Here, a light source unit 140 including two light-guiding members 130 is described below as an example. FIG. 4 is a rough cross-sectional view of the light source unit 140 according to an embodiment. FIG. 5 is a schematic perspective view of a rough structure of the light source unit 140 according to the embodiment.

FIG. 4 is a cross-sectional view of the light source unit 140 taken along the line IV-IV in FIG. 5 at a portion at which a protrusion of one light-guiding member is provided, as described below. The light source unit 140 includes a frame 145, a first mirror 146, light source boards 147, a light-source driving circuit board 148, heat sinks 149, a holder member 150, and light-guiding members 130.

The frame 145 is a member formed by punching out predetermined portions of a strip member long in a main-scanning direction and by bending the strip member. The frame 145 fixes and supports other members. Multiple holes in the frame 145 are provided for attaching other members to the frame 145 using screws and the like. Portions erected by being bent with respect to a bottom portion are used for positioning and fixing other members.

The first mirror 146 is a glass having a surface covered with silver to have a reflection film. The first mirror 146 has a reflection surface, on which the reflection film is formed, end surfaces, which are substantially perpendicular to the reflection surface, and a back surface, which is opposite to the reflection surface. The first mirror 146 has a substantially rectangular cross section. Corners of the first mirror 146 are rounded. The first mirror 146 is fixed to the frame 145 using mirror holders, not illustrated. The first mirror 146 is positioned at a predetermined position and at a predetermined angle on an optical path of read light reflected off the document G. The first mirror 146 is a mirror on which read light that has passed through a slit of the holder member 150, described below, is incident first. The first mirror 146 is positioned substantially right under the slit.

Each of the light source boards 147 is a member that has light-emitting devices (not illustrated) mounted on a surface of a printed circuit board or the like. As illustrated in FIG. 5, the light source boards 147 are attached to the holder member 150 at both end portions of the light-guiding members 130 so as to oppose each other. The light source boards 147 may be provided with an optical system that emits light toward end surfaces of the light-guiding member 130. Light emitting diodes (LED) are most suitable for the light-emitting devices as they are advantageous in terms of size reduction of the device and they have characteristics of being spot light sources. Instead of LEDs, however, other types of devices such as semiconductor elements or light bulbs may be used.

The light-source driving circuit board 148 is a board on which a driving circuit for driving and controlling the light-emitting devices mounted on the light source boards 147 is mounted. The light-source driving circuit board 148 is attached to the frame 145 outside the holder member 150. One end portion of a harness, not illustrated, is connected to the light-source driving circuit board 148. The other end portion of the harness is stretched along the periphery of the holder member 150 and connected to the light source boards 147, so that power that drives the light-emitting devices transmits control signals.

The heat sinks 149 are board members made of a material such as a metal having a high thermal conductivity. The heat sinks 149 are disposed in thermal contact with the back surfaces of the light source boards 147. Heat resulting from illumination of the light-emitting devices is thus transmitted to the heat sinks via the back surfaces of the light source boards 147 and dissipated to the outside.

The holder member 150 is a member that holds two light-guiding members 130. The holder member 150 includes a frame-shaped wall portion 151, long in the main-scanning direction, and attachment recesses 152 formed integrally with the wall portion 151 and each having a substantially semicircular shaped side surface. The wall portion 151 is disposed substantially perpendicularly to the bottom surface of the frame 145. The two attachment recesses 152 are disposed so that recessed portions face the document side. In each of the attachment recesses 152, the corresponding light-guiding member 130 is positioned and fixed. A slit is disposed between the two attachment recesses 152 to allow read light reflected off the document G to pass therethrough. Holes 153c, 153d, 153e, and 153f to which protrusions and gates of the light-guiding members 130, described below, are fitted are formed in the wall surface of the wall portion 151.

Each light-guiding member 130 includes a translucent body 130a that has translucency and has a substantially cylinder shape that is long in the main-scanning direction. Light incident surfaces are provided on both ends of the translucent body 130a in the longitudinal direction. A light emerging surface is provided on one circumferential area of the translucent body 130a, the area extending in the longitudinal direction. A light reflection surface is provided on another circumferential area of the translucent body 130a, the area extending in the longitudinal direction and opposing the light emerging surface. The light-guiding member 130 is molded out of acrylic resin using a mold.

The reflection surface of the light-guiding member 130 is formed in fine triangles (for example, serrations) when viewed in the width direction along the light emerging surface. In addition, in order to increase the light amount with increasing distance toward the middle in the longitudinal direction, the distance between the vertices of adjacent triangles on the reflection surface gradually decreases with increasing distance toward the middle in the longitudinal direction. The shape of the reflection surface is not limited to serrations and may be other shapes. As long as the reflection surface is designed so as to be capable of uniformly reflecting light, the reflection surface may be formed by molding, blasting, or printing.

In the structure of the light source unit 140, light-emitting devices are disposed so as to oppose the light incident surfaces on both ends of each light-guiding member 130. Thus, light emerging from the light-emitting devices is incident on the light incident surfaces of the light-guiding member 130, guided through the inside of the light-guiding member 130, and then caused to directly emerge from the light emerging surface of the light-guiding member 130 or reflected off the light reflection surface and then caused to emerge from the light emerging surface of the light-guiding member 130.

The light emerging surfaces of the light-guiding members 130 face the same portion of the document across the document receiving table 92. Light beams that have emerged from the light emerging surfaces of the light-guiding members 130 are incident on the same portion of the document and thus the portion of the document is illuminated. Light reflected off the portion of the document reaches the first mirror 146 through the slit St as read light and is then reflected toward the mirror unit 141.

Figure 6B:
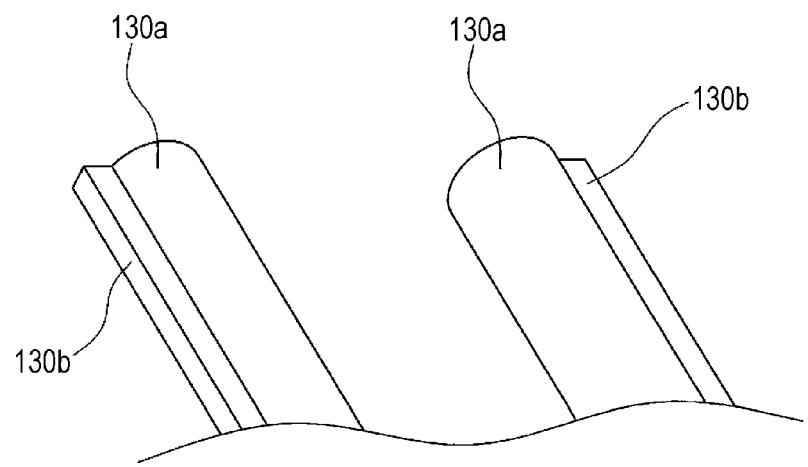
FIG. 6B is a partially-enlarged perspective view of end portions of the light-guiding members illustrated in an enlarged manner.
Figure 6C:
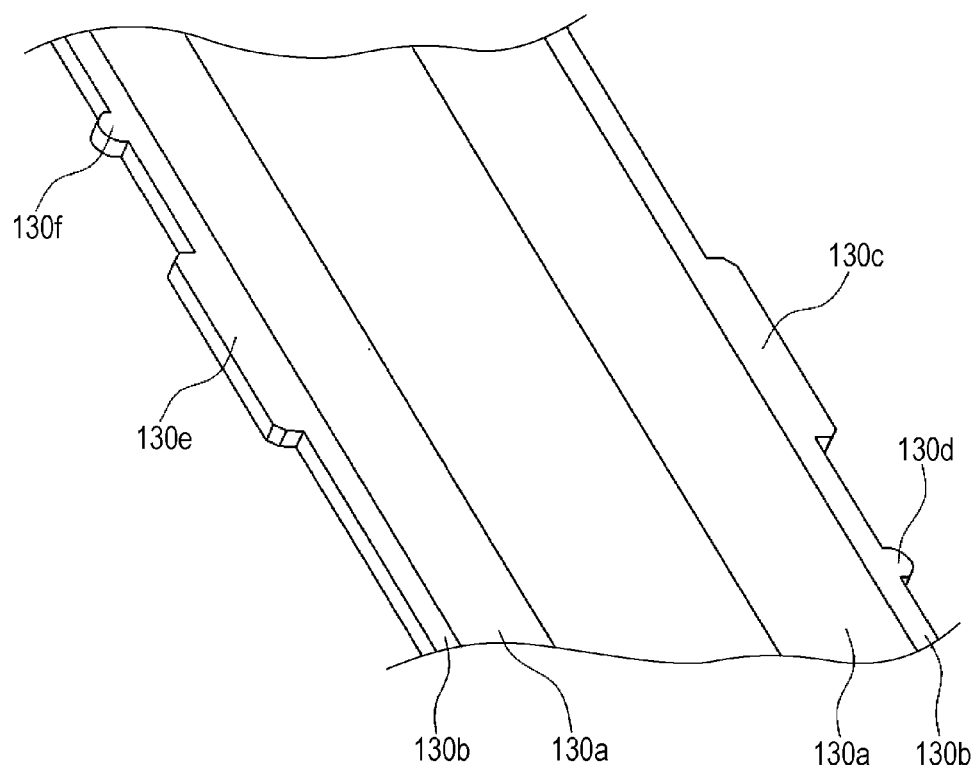
FIG. 6C is a partially-enlarged perspective view of lengthwise middle portions of the light-guiding members illustrated in an enlarged manner.

FIGS. 6A to 6C are schematic perspective views of the light-guiding members 130 illustrated in detail. FIG. 6A is an entire perspective view of the light-guiding members 130, FIG. 6B is a partially enlarged perspective view of end portions of the light-guiding members 130 illustrated in an enlarged manner. FIG. 6C is a partially enlarged perspective view of lengthwise middle portions of the light-guiding members 130 illustrated in an enlarged manner.

As illustrated in FIG. 6A, the light-guiding member 130 has a ridge (rib) 130b extending throughout in the main-scanning direction along the circumferential surface of the long, substantially-cylindrical translucent body 130a. As illustrated in FIG. 6C, gates 130c and 130e having a predetermined width in the main-scanning direction are disposed at substantially the middle portions of the respective light-guiding members 130. Substantially semicircular protrusions 130d and 130f are disposed at positions decentered from the substantially center portions (substantially middle portions) to one end portions in the main-scanning direction of the light-guiding members 130. The protrusions 130d and 130f are disposed asymmetrically in the longitudinal direction. The gates 130c and 130e and the protrusions 130d and 130f are formed in such a manner that part of the ridges 130b is extended in the sub-scanning direction. Here, each translucent body 130a, the corresponding ridge 130b, the corresponding one of the gates 130c and 130e, and the corresponding one of the protrusions 130d and 130f are formed in an integrated unit.

The size of each component of the light-guiding member 130 is not limited to a particular size and may be designed appropriately in accordance with the design of the entire light source unit 140 so that light thrown on the document is distributed in an uniform amount. For example, in the case where the translucent body 130a has a cylindrical shape having a diameter of approximately 2 mm, the thickness of the ridge 130b, the gates 130c and 130e, and the protrusions 130d and 130f is determined as approximately 1 mm and the width of the ridge 130b in the sub-scanning direction is determined as approximately 2 mm. The gates 130c and 130e and the protrusions 130d and 130f protrude approximately 2 mm from the ridge 130b and the protrusions 130d and 130f have a semicircular shape having a radius of approximately 2 mm.

As illustrated in FIGS. 6A to 6C, while being spaced apart from each other a predetermined distance, the two light-guiding members 130 are arranged side by side in the sub-scanning direction, along an illuminated surface of the document, in such a manner that their longitudinal directions are parallel to each other. The gate 130c and the protrusion 130d of one of the two light-guiding members 130 are disposed at the same positions as the gate 130e and the protrusion 130f of the other one of the light-guiding members 130 so as to be rotationally symmetric with each other. Thus, one light-guiding member 130 may be replaced with the other light-guiding member 130.

The ridge (rib) 130b extends throughout the light-guiding member 130 in the main-scanning direction. Thus, the lengthwise mechanical strength of the light-guiding member 130 increases, thereby minimizing an occurrence of bending and a frequency of uneven light illumination.

The gates 130c and 130e and the protrusions 130d and 130f are formed at the ridges 130b. Thus, even when part of light arrives at one ridge 130b while light that has entered from an end surface of the translucent body 130a transmits through the translucent body 130a, the light negligibly arrives at the gate 130c or 130e or the protrusion 130d or 130f from the ridge 130b. The light-guiding members 130 including the gates 130c and 130e and the protrusions 130d and 130f thus minimize problems, such as scattering of light due to the gates 130c and 130e or the protrusions 130d and 130f, concentration of light amount, and emergence of light from the gates 130c and 130e or the protrusions 130d and 130f. Thus, an area from which light is thrown in an uneven amount can be made less likely to occur. Here, forming the ridge 130b can minimize an occurrence of an area from which light is thrown in an uneven amount. Thus, the gates 130c and 130e and the protrusions 130d and 130f can be designed highly flexibly.

Figure 7:
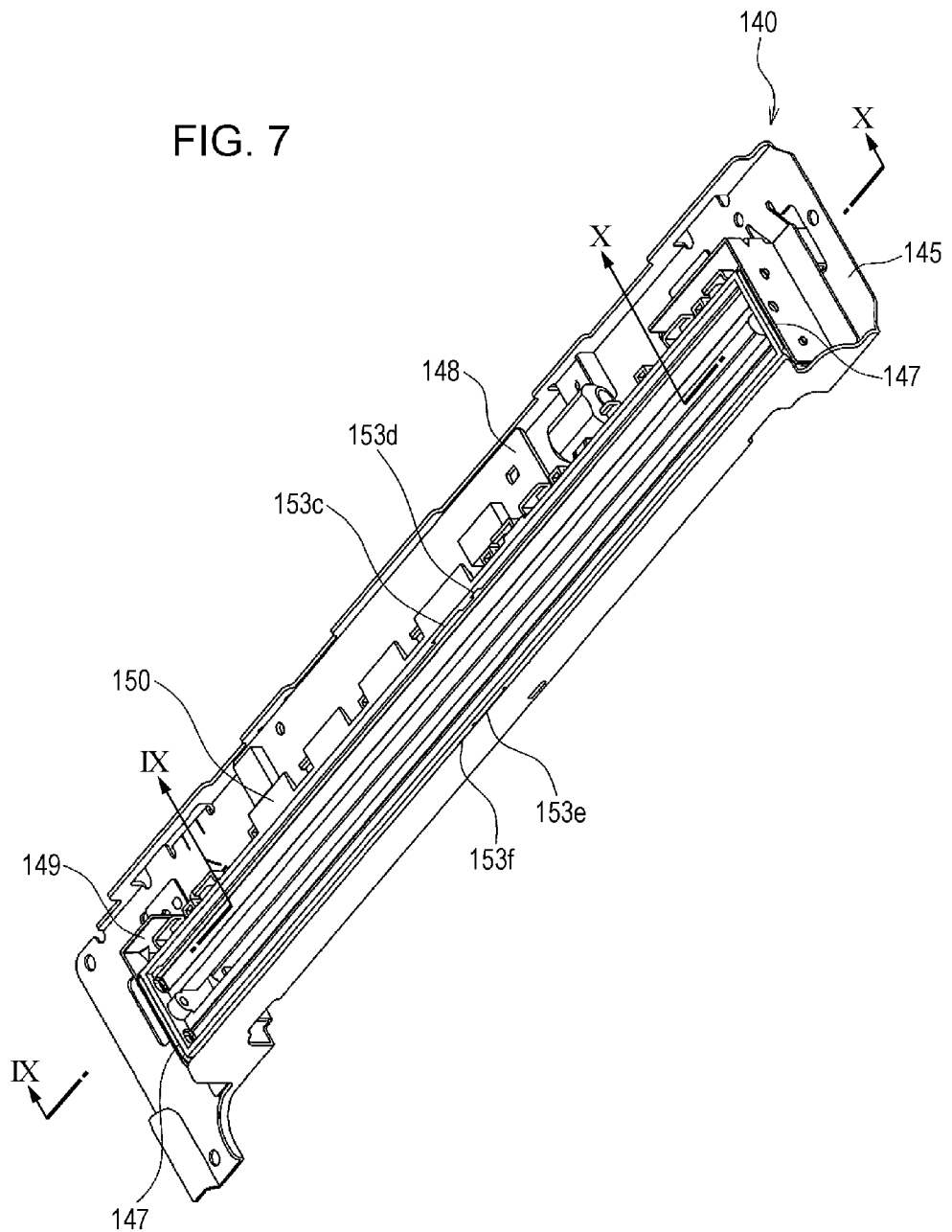
FIG. 7 is a schematic perspective view of the light source unit from which the light-guiding members are removed.
Figure 8:
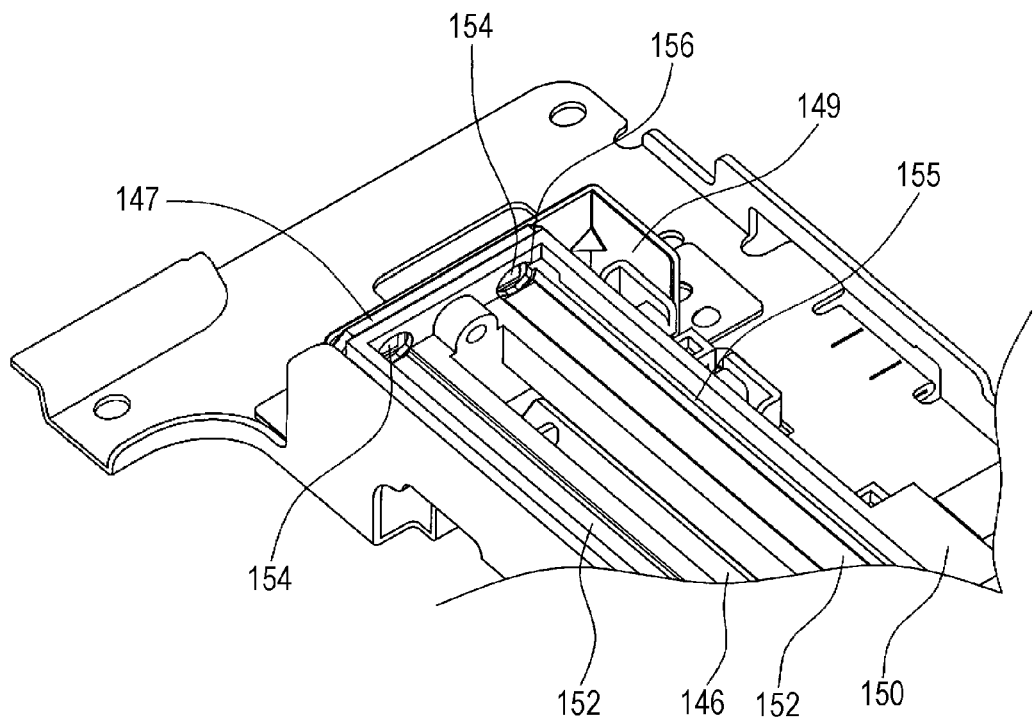
FIG. 8 is a schematic perspective view of one end portion of the light source unit illustrated in an enlarged manner.
Figure 9:
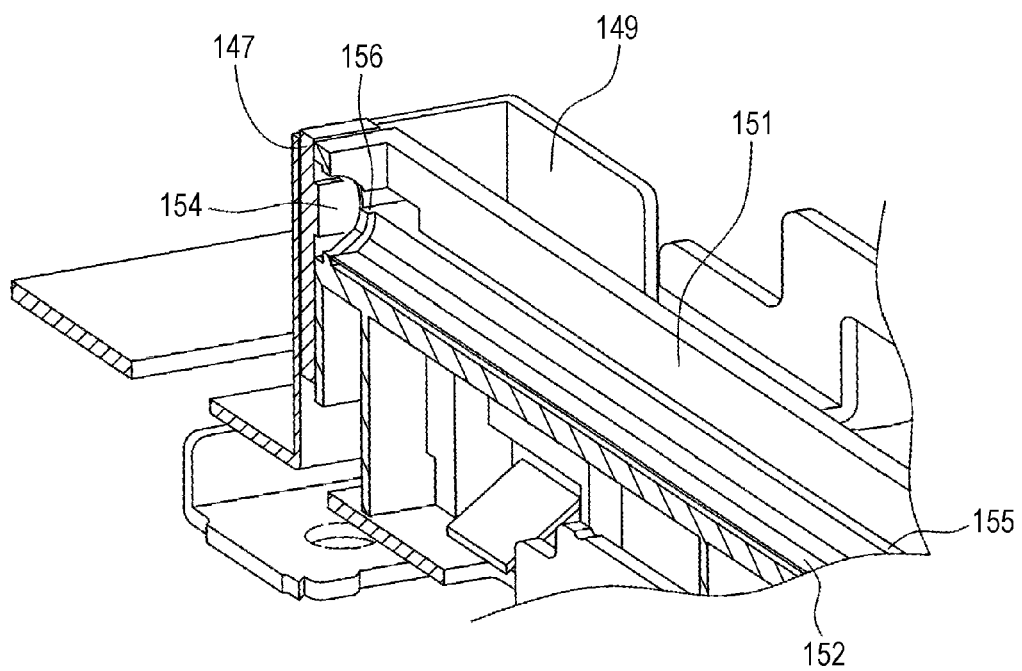
FIG. 9 is a cross-sectional perspective view of the light source unit at one end portion on the near side in FIG. 7 taken along the line IX-IX.
Figure 10:
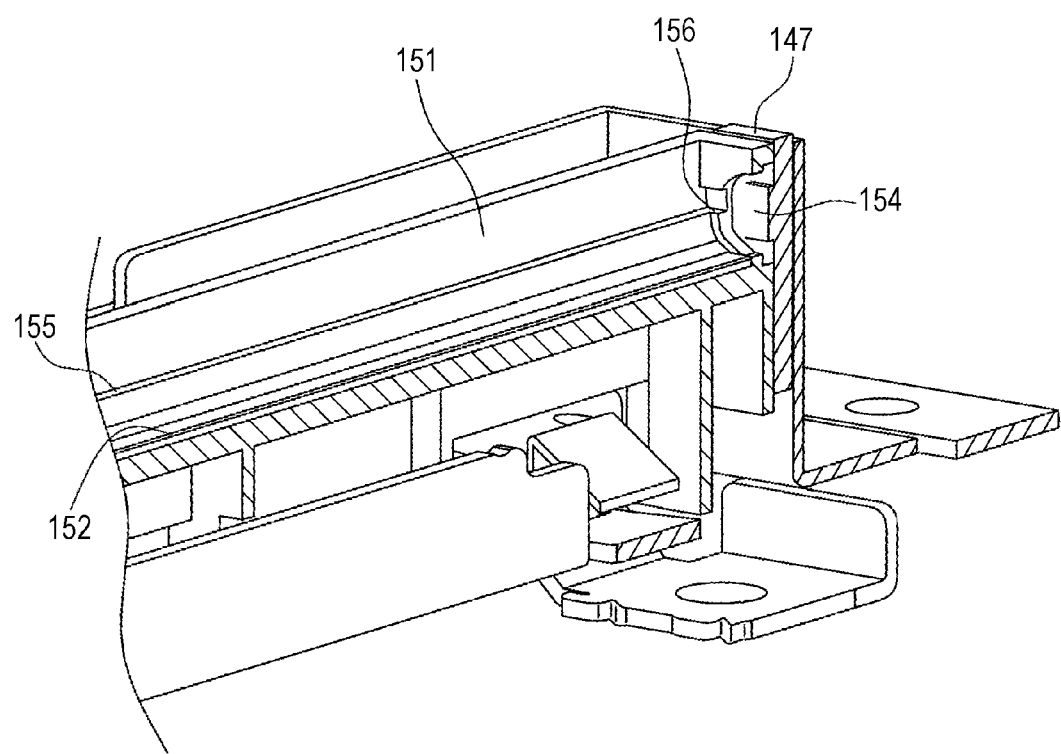
FIG. 10 is a cross-sectional perspective view of the light source unit at one end portion on the far side in FIG. 7 taken along the line X-X.

Now, the holder member 150 is described in detail referring to the drawings. FIG. 7 is a schematic perspective view of the light source unit 140 from which the light-guiding members 130 are removed. FIG. 8 is a schematic perspective view of one end portion of the light source unit 140 illustrated in an enlarged manner. FIG. 9 is a cross-sectional perspective view of the light source unit 140 at one end portion on the near side in FIG. 7 taken along the line IX-IX. FIG. 10 is a cross-sectional perspective view of the light source unit at one end portion on the far side in FIG. 7 taken along the line X-X.

As illustrated in FIG. 7, holes 153c and 153e that respectively extend through opposing wall surfaces are located at substantially the middle of the holder member 150 in the main-scanning direction. Holes 153d and 153f that extend through the wall surfaces are located at positions decentered from the substantially middle portions to one end portions of the holder members 150 in the main-scanning direction. Here, the hole 153d in one wall surface is displaced to the far side in FIG. 7, whereas the hole 153f in the other wall surface is displaced to the near side in FIG. 7. The holes 153d and 153f are disposed so as to be rotationally symmetric with each other.

The gates 130c and 130e of the light-guiding members 130 are inserted and fitted into the holes 153c and 153e, respectively. The protrusions 130d and 130f of the light-guiding members 130 are inserted and fitted into the holes 153d and 153f, respectively. In the same manner as the positions of the gates 130c and 130e and the protrusions 130d and 130f, the hole 153c and the hole 153d are disposed so as to be rotationally symmetrical with the hole 153e and the hole 153f. Thus, one of the light-guiding members 130 can be replaced with the other light-guiding member 130.

As illustrated in FIG. 8 to FIG. 10, openings 154 are formed in each wall surface of the holder member 150 at a lengthwise end portion, the wall surface facing the corresponding end surfaces of the light-guiding members 130. Each light source board 147 is attached to the corresponding outer wall surface of the holder member 150. Light-emitting devices (not illustrated) mounted on the light source boards 147 are disposed so as to face inward through the openings 154. The holder member 150 also has support portions 155 extending along the longitudinal wall surface of the holder member 150 and forming steps on the wall portion 151. Each support portion 155 extends throughout the holder member 150 in the longitudinal direction. Each support portion 155 may be formed at at least a lengthwise end portion. Stepped portions 156 are formed on the wall surface at the longitudinal end. Each stepped portion 156 is an extension of the corresponding support portion 155 and is connected to the corresponding opening 154.

Figure 11:
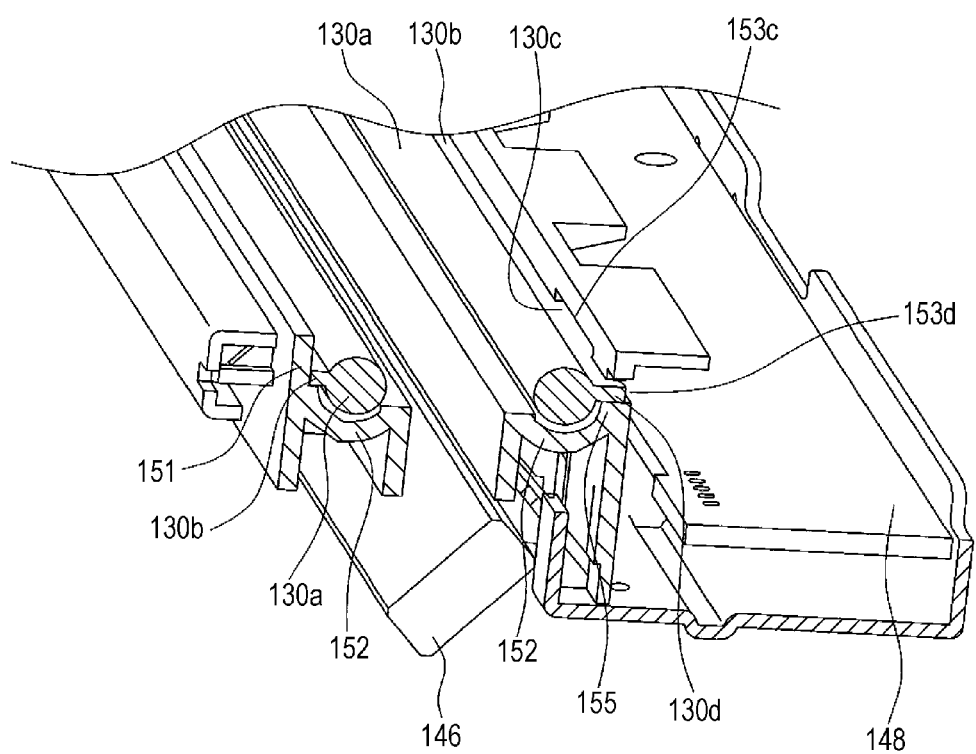
FIG. 11 is a cross-sectional perspective view of the light-guiding members attached to a holder member.

FIG. 11 is a cross-sectional perspective view of the light-guiding members 130 attached to the holder member 150. Each light-guiding member 130 is attached to the corresponding attachment recess 152 in the following manner. One end surface of a light-guiding member 130 is disposed so as to face one opening 154 of the holder member 150. The light-guiding member 130 is fitted into the attachment recess 152 while being pressed so as to be slightly bent. The other end surface of the light-guiding member 130 is disposed so as to face the opposing opening 154 of the holder member 150. When the light-guiding member 130 is restored from bending, the gate 130c and the protrusion 130d of the light-guiding member 130 are respectively inserted and fitted into the holes 153c and 153d, as illustrated in FIG. 11. Similarly, when the other light-guiding member 130 is attached to the other attachment recess 152, the gate 130e and the protrusion 130f of the light-guiding member 130 are respectively inserted and fitted into the holes 153e and 153f.

Here, in order for the gates 130c and 130e and the protrusions 130d and 130f to be respectively fitted into the holes 153c, 153e, 153d, and 153f formed at the corresponding positions, the light-guiding member 130 is accurately and easily positioned in the light source unit 140. The light-guiding member 130 is restricted in the main-scanning direction and the vertical direction. Thus, the light-guiding member 130 is prevented from being bent or warped due to vibrations or other causes.

The protrusions 130d and 130f are decentered from substantially middle portions to one end portions of the light-guiding members 130 in the main-scanning direction and disposed so as to be asymmetric with each other. Thus, in case an operator erroneously places a light-guiding member 130 in such a manner that its reflection surface faces up and its light emerging surface faces down, the operator can easily see the abnormal positioning of the protrusion 130d or 130f, whereby the light-guiding member 130 can be prevented from being erroneously attached. Moreover, even in case where the operator does not notice the abnormal positioning of the protrusion 130d or 130f, the light-guiding member 130 fails to be attached to the attachment recess 152 since the protrusion 130d or 130f interferes with the wall portion 151 that has neither the hole 153d nor 153f. Thus, the light-guiding member 130 can be reliably prevented from being erroneously attached.

Figure 12:
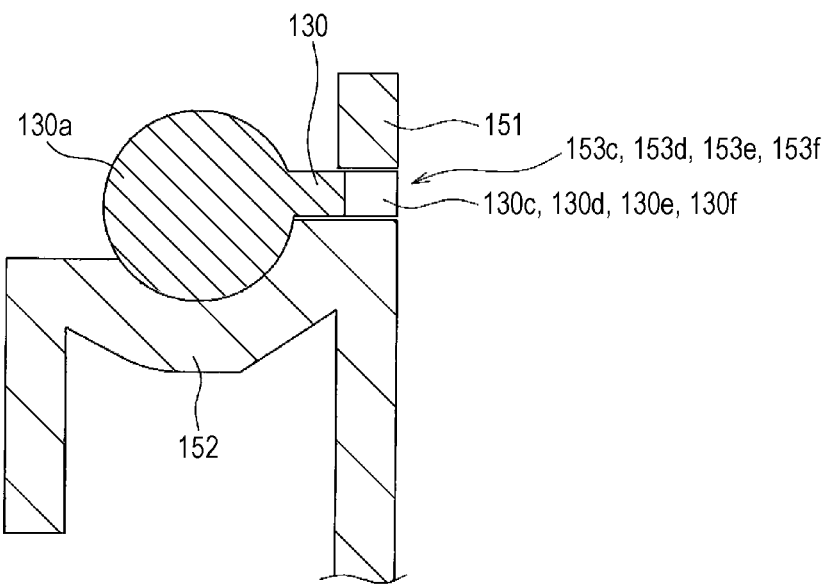
FIG. 12 is a schematic cross-sectional view of the light-guiding member attached to an attachment recess.

FIG. 12 is a schematic cross-sectional view of one light-guiding member 130 attached to an attachment recess 152. As illustrated in FIG. 11 and FIG. 12, the ridges 130b are supported by the support portions 155 throughout in the main-scanning direction. The entireties of the light-guiding members 130 are thus uniformly and stably held by the attachment recesses 152 and the support portions 155. Moreover, the gates 130c and 130e and the protrusions 130d and 130f are fitted into the respective holes 153c, 153e, 153d, and 153f and thus the vertical movement of the light-guiding members 130 is restricted. Since the light-guiding members 130 are prevented from being bent and warped and restricted from rotating, warpage of the light-guiding members 130 can be minimized while the light-guiding members 130 are allowed to be accurately and easily positioned. Thus, light can be thrown on a subject in a uniform amount.

Figure 13:
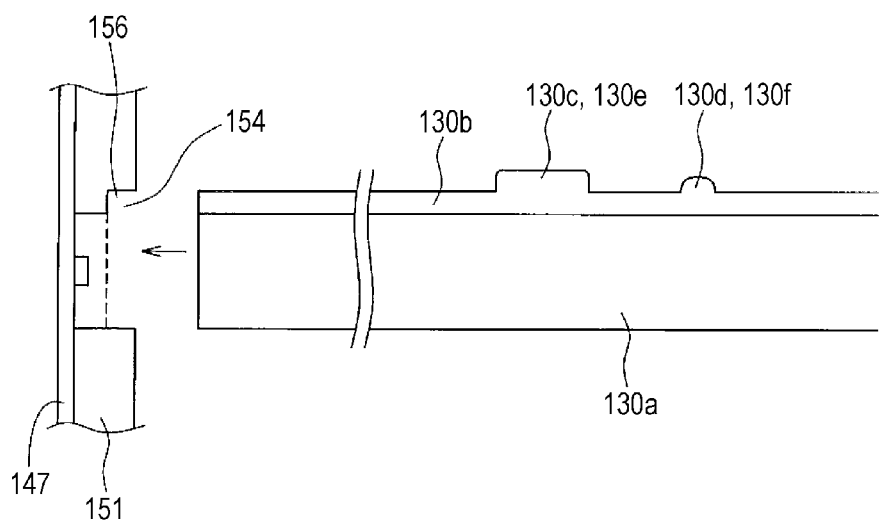
FIG. 13 is a schematic plan view illustrating the positional relationship between the light-guiding member and a stepped portion in an opening.

FIG. 13 is a schematic plan view illustrating the positional relationship between one light-guiding member 130 and the corresponding stepped portion 156 in one of the openings 154. Each opening 154 is formed in a wall portion 151 at an end portion of the holder member 150 in the main-scanning direction. The light-emitting devices on the light source boards 147 are located in the respective openings 154, in through holes having substantially the same diameter as that of the translucent bodies 130a. The stepped portion 156 is grooved to the middle in the thickness direction of the wall portion 151. Each support portion 155 and the corresponding opening 154 are connected together with the corresponding stepped portion 156 interposed therebetween.

When one light-guiding member 130 is disposed so as to extend along the support portion 155 and face the openings 154 in order to be attached to the corresponding attachment recess 152, the translucent body 130a having substantially the same diameter as that of the openings 154 is partially inserted into the openings 154. Each stepped portion 156, extending up to the middle in the thickness direction of the wall portion 151, serves as a restricting portion and does not extend through the wall portion 151. Thus, the end surface of the ridge 130b comes into contact with the wall portion 151 in the middle in the thickness direction. The light-guiding member 130 is thus restricted to the position at which the end surface of the ridge 130b comes into contact with the stepped portion (restricting portion) 156, whereby the position of the light-guiding member 130 in the main-scanning direction is fixed.

Each stepped portion 156 is grooved as an insertion hole having a width approximately the same as the thickness of the ridge 130b. The stepped portion 156 restricts vertical movement of the ridge 130b and rotation of the light-guiding member 130. In addition, since one support portion 155 and the corresponding opening 154 are connected together with the corresponding stepped portion 156 interposed therebetween, the light-guiding member 130 can be prevented from being bent at the lengthwise end portions.

In the state where each stepped portion 156 and the corresponding end surface of the ridge 130b are in contact with each other, one end surface of the light-guiding member 130 and the corresponding light-emitting device on the light source board are spaced apart from each other by a predetermined distance, which is kept stable. Thus, each light-emitting device and the corresponding light-guiding member 130 can be accurately and easily positioned, whereby light can be thrown on a subject in a uniform amount. In addition, the end surface of the light-guiding member 130 can be prevented from coming into contact with the light-emitting device and being broken.

Second Embodiment

Figure 14A:
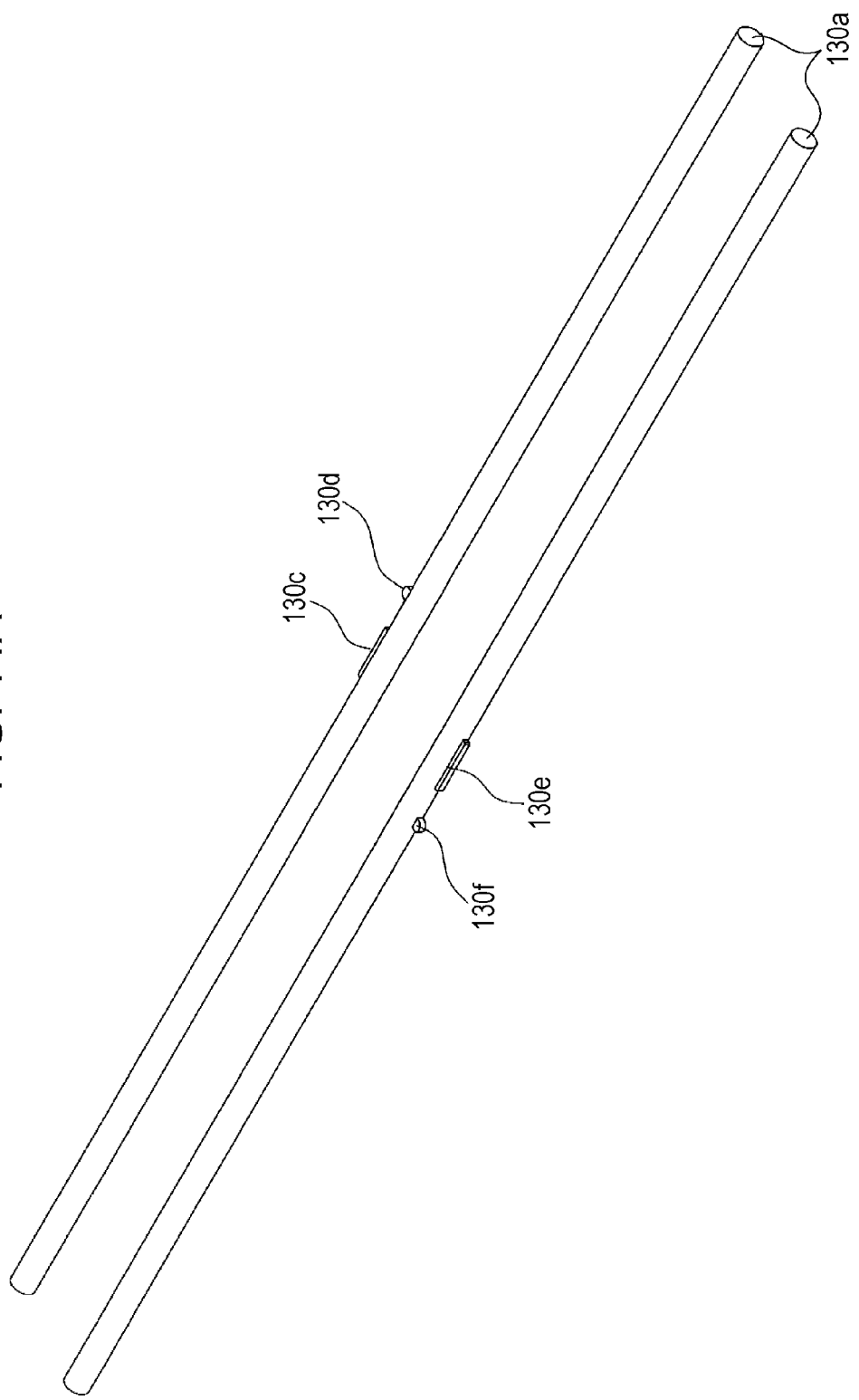
FIG. 14A is a general perspective view of light-guiding members according to a second embodiment.
Figure 14B:
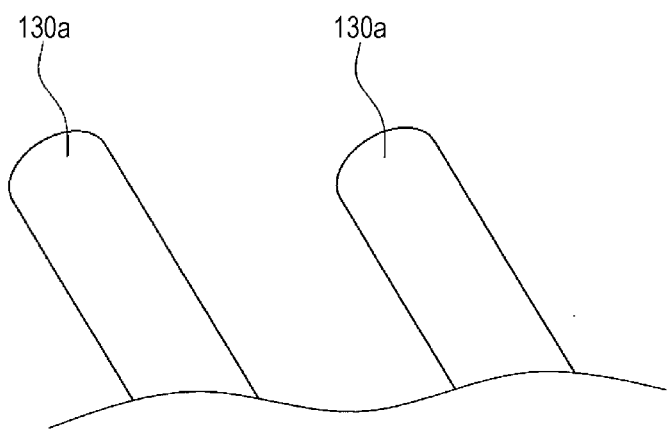
FIG. 14B is a partially-enlarged perspective view of end portions of the light-guiding members according to the second embodiment illustrated in an enlarged manner.
Figure 14C:
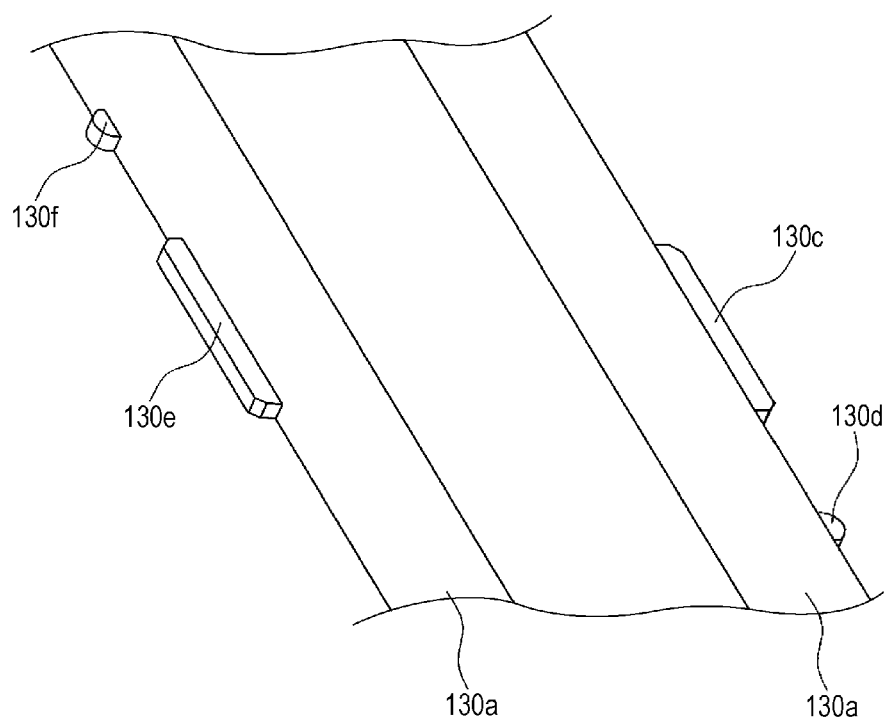
FIG. 14C is a partially-enlarged perspective view of lengthwise middle portions of the light-guiding members according to the second embodiment illustrated in an enlarged manner.

Now, a second embodiment of the disclosure is described. Components that are the same as those in the first embodiment are not described. FIGS. 14A to 14C are schematic perspective views of light-guiding members 130 according to the second embodiment. FIG. 14A is a general perspective view of the light-guiding members 130 according to the second embodiment. FIG. 14B is a partially-enlarged perspective view of end portions of the light-guiding members 130 illustrated in an enlarged manner. FIG. 14C is a partially-enlarged perspective view of lengthwise middle portions of the light-guiding members 130 illustrated in an enlarged manner.

As illustrated in FIGS. 14A to 14C, the light-guiding members 130 according to the second embodiment respectively include gates 130c and 130e, having a predetermined width in the main-scanning direction, in substantially the middle portions of the long, substantially cylindrical translucent bodies 130a. The light-guiding members 130 also include protrusions 130d and 130f, having a substantially semicircular-cylinder shape, at positions decentered from substantially the center portions (substantially the middle portion) to one end portions in the main-scanning direction of the light-guiding members 130. Here, each translucent body 130a, the corresponding one of the gates 130c and 130e, and the corresponding one of the protrusions 130d and 130f are formed in an integrated unit.

The size of the components of each light-guiding member 130 is not limited to any particular one and may be appropriately designed in accordance with the design of the entire light source unit 140 so that light thrown on the document is distributed in an uniform amount. For example, in the case where the translucent body 130a has a cylindrical shape having a diameter of approximately 2 mm, the thickness of the gates 130c and 130e and the protrusions 130d and 130f is determined as approximately 1 mm. The gates 130c and 130e and the protrusions 130d and 130f protrude approximately 2 mm from the translucent body 130a and the protrusions 130d and 130f have a semicircular shape having a radius of approximately 2 mm.

As illustrated in FIGS. 14A to 14C, while being spaced apart from each other a predetermined distance, the two light-guiding members 130 are arranged side by side in the sub-scanning direction, along an illuminated surface of the document, in such a manner that their longitudinal directions are parallel to each other. The gate 130c and the protrusion 130d of one of the two light-guiding members 130 are disposed at the same positions as the gate 130e and the protrusion 130f of the other one of the light-guiding members 130. The two light-guiding members 130 are disposed so as to be rotationally symmetric with each other. Thus, one light-guiding member 130 may be replaced with the other light-guiding member 130.

Here, in order for the gates 130c and 130e and the protrusions 130d and 130f to be respectively fitted into the holes 153c, 153e, 153d, and 153f formed at the corresponding positions, the light-guiding members 130 are accurately and easily positioned in the light source unit 140. The light-guiding members 130 are restricted in the main-scanning direction and the vertical direction. Thus, the light-guiding members 130 are prevented from being bent or warped due to vibrations or other causes. Since the light-guiding members 130 are prevented from being bent and warped and restricted from rotating, warpage of the light-guiding members 130 can be minimized while the light-guiding members 130 are allowed to be accurately and easily positioned. Thus, light can be thrown on a subject in a uniform amount.

The protrusions 130d and 130f are decentered from substantially middle portions to one end portions of the light-guiding members 130 in the main-scanning direction and disposed so as to be asymmetric with each other. Thus, in case an operator erroneously places a light-guiding member 130 in such a manner that its reflection surface faces up and its light emerging surface faces down, the operator can easily see the abnormal positioning of the protrusion 130d or 130f, whereby the light-guiding member 130 can be prevented from being erroneously attached. Moreover, even in case where the operator does not notice the abnormal positioning of the protrusion 130d or 130f, the light-guiding member 130 fails to be attached to the attachment recess 152 since the protrusion 130d or 130f interferes with the wall portion 151 that has neither the hole 153d nor 153f. Thus, the light-guiding member 130 can be reliably prevented from being erroneously attached.

Third Embodiment

The first embodiment has described a case where the light source unit 140 includes two light-guiding members 130. However, one light-guiding member 130 and one attachment recess 152 suffice for the light source unit 140. As in the case of the other embodiments, holes 153c and 153d are formed in the wall portion 151 of the holder member 150. Thus, inserting and fitting the gate 130c and the protrusion 130d of the light-guiding member 130 into the holes 153c and 153d can minimize warpage of the light-guiding member 130 while the light-guiding member 130 is accurately and easily positioned and light can be thrown on a subject in a uniform amount.

The disclosure is not limited to the embodiments described above. The disclosure may be modified in various manners within the range of claims. Embodiments obtained by appropriately combining techniques disclosed in different embodiments are also included in the technical range of the disclosure.

The present disclosure contains subject matter related to that disclosed in Japanese Priority Patent Application JP 2014-137402 filed in the Japan Patent Office on Jul. 3, 2014, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An illuminating device, comprising:
   a light-emitting device that emits light; and
   a light-guiding member that is adjacent to the light-emitting device and guides the light from the light-emitting device to a light emerging surface from which the light is projected on a subject; wherein
   the light emerging surface extends in a longitudinal direction of the light-guiding member; and
   the light-guiding member includes a ridge which is integrally provided together with the light-guiding member as a single monolithic element.

2. The illuminating device according to claim 1, wherein the light-guiding member further includes a protrusion on the ridge, and
   the illuminating device further includes an attachment recess, which holds the light-guiding member, and a holder, which includes a fit portion to which the protrusion is fitted.

3. The illuminating device according to claim 2, wherein the protrusion is decentered relative to one lengthwise end portion of the light-guiding member.

4. The illuminating device according to claim 2, wherein the fit portion is defined in a wall surface of the holder extending in a longitudinal direction of the holder and the fit portion includes a hole into which the protrusion is inserted.

5. The illuminating device according to claim 2, wherein the holder includes an insertion hole, into which the ridge is fitted, at a lengthwise end portion of the holder.

6. The illuminating device according to claim 5, wherein the insertion hole includes a restrictor that restricts lengthwise movement of the light-guiding member.

7. The illuminating device according to claim 2, wherein the holder includes a support that supports the ridge and is provided at least at a lengthwise end portion of the holder.

8. The illuminating device according to claim 2, wherein the protrusion and the fit portion are provided on a portion of the light-guiding member other than the end portion in the longitudinal direction of the light-guiding member.

9. An image reading device, comprising:
   the illuminating device according to claim 1;
   a transparent document table on which the subject is placed; and
   a reader that reads the subject.

10. An image forming device, comprising:
    the image reading device according to claim 9; and
    a printer that prints an image of the subject read by the image reading device on a recording sheet.

11. An illuminating device, comprising:
    a light-emitting device that emits light; and a light-guiding member that is adjacent to the light-emitting device and guides the light from the light-emitting device to a light emerging surface from which the light is projected on a subject; wherein the light emerging surface extends in a longitudinal direction of the light-guiding member;

the light-guiding member includes:
- a protrusion integrally provided together with the light-guiding member as a single monolithic element, and
- a holder that holds the light-guiding member;

the holder includes:
- a recess in which the light-guiding member is disposed, the recess facing a side of the subject, and
- a wall portion defined integrally with the recess and extending in the longitudinal direction; and
- the wall portion includes a fit portion to which the protrusion is fitted.

12. The illuminating device according to claim 11, wherein the protrusion is decentered relative to one lengthwise end portion of the light-guiding member.

13. The illuminating device according to claim 11, wherein the fit portion is defined in a wall surface of the holder extending in a longitudinal direction of the holder and the fit portion is a hole into which the protrusion is inserted.

14. The illuminating device according to claim 11, wherein the holder includes an insertion hole, into which the protrusions are fitted, at a lengthwise end portion of the holder.

15. The illuminating device according to claim 14, wherein the insertion hole includes a restrictor that restricts lengthwise movement of the light-guiding member.

16. The illuminating device according to claim 11, wherein the holder includes a support that supports the protrusion and is provided at least a lengthwise end portion of the holder.

17. An image reading device, comprising:
the illuminating device according to claim 11;
a transparent document table on which the subject is placed; and
a reader that reads the subject.

18. An image forming device, comprising:
the image reading device according to claim 17; and
a printer that prints an image of the subject read by the image reading device on a recording sheet.

19. The illuminating device according to claim 11, wherein the protrusion and the fit portion are provided on a portion of the light-guiding member other than the end portion in the longitudinal direction of the light-guiding member.

* * * * *